(12) United States Patent
Uejo

(10) Patent No.: US 11,954,519 B2
(45) Date of Patent: Apr. 9, 2024

(54) INFORMATION PROCESSING APPARATUS, METHOD, AND RECORDING MEDIUM CONTROLLING EXECUTION OF A PROCESS BASED ON THE AMOUNT OF A TYPE OF LOG DATA STORED

(71) Applicant: Masahiko Uejo, Kanagawa (JP)

(72) Inventor: Masahiko Uejo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 296 days.

(21) Appl. No.: 17/457,103

(22) Filed: Dec. 1, 2021

(65) Prior Publication Data

US 2022/0179681 A1 Jun. 9, 2022

(30) Foreign Application Priority Data

Dec. 7, 2020 (JP) .............................. 2020-202505

(51) Int. Cl.
*G06F 9/48* (2006.01)
*H04N 1/00* (2006.01)
*H04N 1/21* (2006.01)
*H04N 1/32* (2006.01)

(52) U.S. Cl.
CPC ......... *G06F 9/485* (2013.01); *H04N 1/00477* (2013.01); *H04N 1/21* (2013.01); *H04N 1/32106* (2013.01); *H04N 2201/214* (2013.01); *H04N 2201/3202* (2013.01)

(58) Field of Classification Search
None
See application file for complete search history.

(56) References Cited

U.S. PATENT DOCUMENTS

| 11,269,680 B2* | 3/2022 | Minami ................. G06F 9/485 |
| 2008/0074683 A1* | 3/2008 | Yanamura .......... H04N 1/32363 358/1.16 |
| 2019/0286399 A1* | 9/2019 | Niimoto ................ G06F 3/1274 |
| 2021/0149604 A1 | 5/2021 | Uejoh |

FOREIGN PATENT DOCUMENTS

| JP | 2007-166176 | | 6/2007 |
| JP | 2008052390 A | * | 3/2008 |
| JP | 2009065524 A | * | 3/2009 |
| JP | 2011039720 A | * | 2/2011 |
| JP | 2013-093058 | | 5/2013 |
| JP | 2021027380 A | * | 2/2021 |

* cited by examiner

*Primary Examiner* — Scott A Rogers
(74) *Attorney, Agent, or Firm* — IPUSA, PLLC

(57) ABSTRACT

An information processing apparatus includes a memory and processing circuitry. The memory stores log data generated by an execution of a process. The processing circuity stops the execution of the process in a state where the process is being executed and when an amount of the log data in the memory is larger than a first threshold, and restarts the execution of the process in a state where the execution of the process is stopped and when the amount of the log data in the memory is smaller than a second threshold that is smaller than the first threshold.

7 Claims, 5 Drawing Sheets

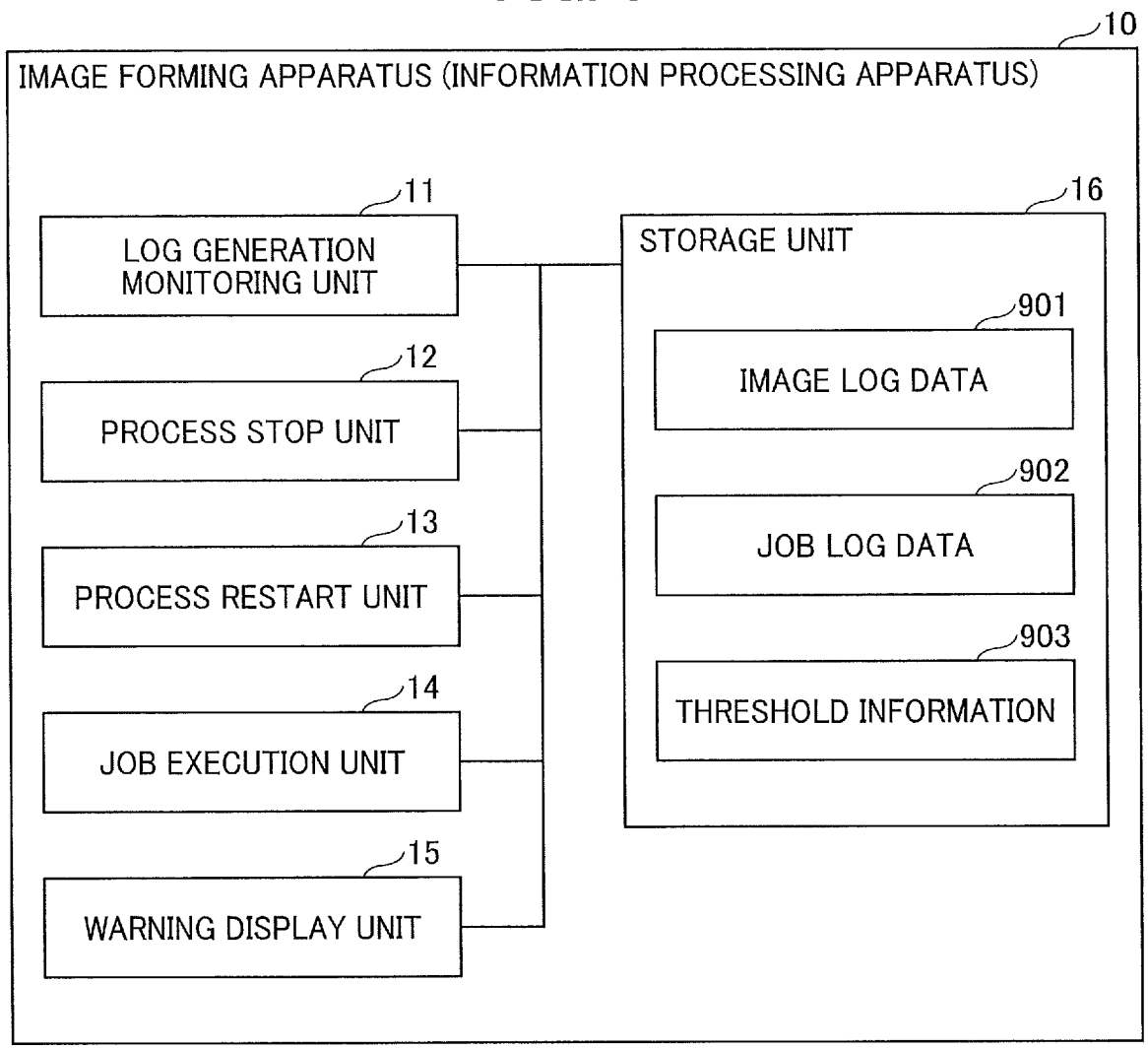

INFORMATION PROCESSING APPARATUS, METHOD, AND RECORDING MEDIUM CONTROLLING EXECUTION OF A PROCESS BASED ON THE AMOUNT OF A TYPE OF LOG DATA STORED

CROSS-REFERENCE TO RELATED APPLICATION

This patent application is based on and claims priority pursuant to 35 U.S.C. § 119(a) to Japanese Patent Application No. 2020-202505, filed on Dec. 7, 2020, in the Japan Patent Office, the entire disclosure of which is hereby incorporated by reference herein.

BACKGROUND

Technical Field

Embodiments of the present disclosure relate to an information processing apparatus, an information processing method, and a non-transitory recording medium storing an information processing program.

Discussion of the Background Art

A technique is known that generates log data indicating, for example, an execution history of a job including image processing or the like and transfers the log data to an external device. For example, an image processing apparatus is known that transfers log data to a management server via a network at a predetermined timing.

SUMMARY

According to an embodiment of the present disclosure, an information processing apparatus includes a memory and processing circuitry. The memory stores log data generated by an execution of a process. The processing circuity stops the execution of the process in a state where the process is being executed and when an amount of the log data in the memory is larger than a first threshold, and restarts the execution of the process in a state where the execution of the process is stopped and when the amount of the log data in the memory is smaller than a second threshold that is smaller than the first threshold.

According to another embodiment of the present disclosure, there is provided an information processing method to be executed by an information processing apparatus configured to store log data generated by an execution of a process. The method includes stopping and restarting. The stopping stops the execution of the process in a state where the process is being executed and when an amount of the log data stored in the information processing apparatus is larger than a first threshold. The restarting restarts the execution of the process in a state where the execution of the process is stopped and when the amount of the log data stored in the information processing apparatus is smaller than a second threshold that is smaller than the first threshold.

According to still another embodiment of the present disclosure, there is provided a non-transitory recording medium storing computer-readable program code that, when executed by a computer, causes the computer storing log data generated by an execution of a process to execute: stopping the execution of the process in a state where the process is being executed and when an amount of the log data stored in the computer is larger than a first threshold; and restarting the execution of the process in a state where the execution of the process is stopped and when the amount of the log data stored in the computer is smaller than a second threshold that is smaller than the first threshold.

BRIEF DESCRIPTION OF SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 3 is a diagram illustrating an example of functions of the image forming apparatus;

FIG. 4 is a diagram illustrating an example of threshold information;

Figure 1:
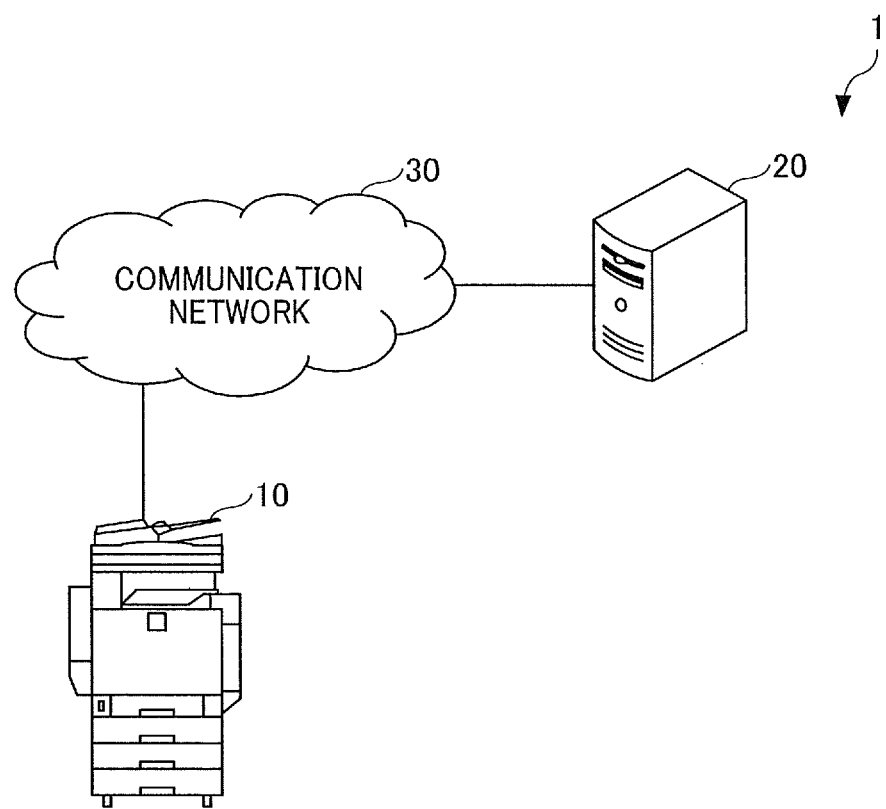
FIG. 1 is a diagram illustrating an example of a system configuration of an image forming system.

The accompanying drawings are intended to depict embodiments of the present invention and should not be interpreted to limit the scope thereof. The accompanying drawings are not to be considered as drawn to scale unless explicitly noted.

DESCRIPTIONS OF EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, an embodiment of an image forming system including an information processing apparatus according to the present disclosure will be described with reference to the drawings.

FIG. 1 is a diagram illustrating an example of a system configuration of the image forming system.

The image forming system 1 includes an image forming apparatus 10 and a log management server 20. The image forming apparatus 10 and the log management server 20 are communicably connected via a communication network 30.

The image forming apparatus 10 is an example of an information processing apparatus according to the present disclosure, and is, for example, a multifunction peripheral/product/printer (MFP) or the like. The image forming apparatus 10 executes various processes and stores log data generated by execution of the processes. Specifically, the image forming apparatus 10 executes various processes in units of jobs defining a series of processes, and stores log (job log) data indicating an execution history of the jobs.

When executing a process related to image formation, the image forming apparatus 10 stores log (image log) data indicating an image.

The image forming apparatus 10 transfers the stored log data to the log management server 20 periodically or in response to an operation by an administrator or the like, and deletes the successfully transferred log data.

The log management server 20 receives and manages log data from the image forming apparatus 10. For example, the log management server 20 executes processes such as search, display, and deletion of log data in response to a request from a user. The log management server 20 may receive log data from a plurality of image forming apparatuses 10.

Figure 2:
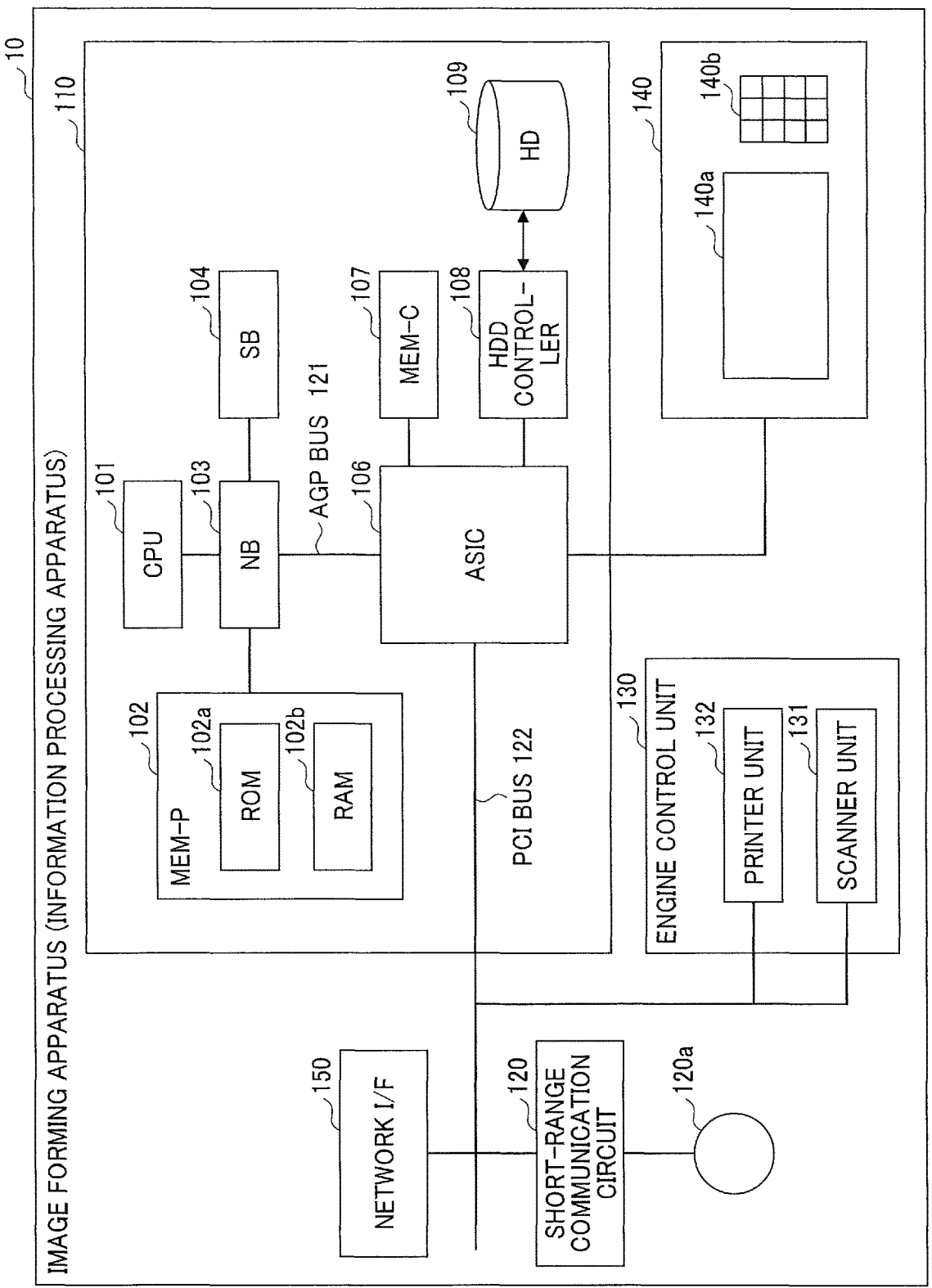
FIG. 2 is a diagram illustrating an example of a hardware configuration of the image forming apparatus.

FIG. 2 is a diagram illustrating an example of a hardware configuration of the image forming apparatus.

The image forming apparatus 10 includes a controller 110, a short-range communication circuit 120, an engine control unit 130, an operation panel 140, and a network I/F 150.

Among them, the controller 110 includes a central processing unit (CPU) 101 that is a main part of a computer, a system memory (MEM-P) 102, a north bridge (NB) 103, a south bridge (SB) 104, an application specific integrated circuit (ASIC) 106, a local memory (MEM-C) 107, a hard disk drive (HDD) controller 108, and a hard disk (HD) 109. The NB 103 and the ASIC 106 are connected by an accelerated graphics port (AGP) bus 121.

Among them, the CPU 101 is a control unit that performs overall control of the image forming apparatus 10. The NB 103 is a bridge for connecting the CPU 101 to the MEM-P 102, the SB 104, and the AGP bus 121. The NB 103 includes a memory controller that controls reading and writing from and to the MEM-P 102, a peripheral component interconnect (PCI) master, and an AGP target.

The MEM-P 102 includes a ROM 102a that is a memory storing programs and data for realizing each function of the controller 110, and a RAM 102b that is used as a drawing memory or the like at the time of developing programs and data and memory printing. The programs stored in the RAM 102b may be provided by being recorded as a file in an installable format or an executable format in a computer-readable recording medium such as a compact disc (CD)-ROM, a CD-R, or a digital versatile disc (DVD).

The SB 104 is a bridge for connecting the NB 103 to a PCI device and a peripheral device. The ASIC 106 is an integrated circuit (IC) for image processing having a hardware element for image processing, and serves as a bridge that connects the AGP bus 121, the PCI bus 122, the HDD controller 108, and the MEM-C 107.

The ASIC 106 includes a PCI target, an AGP master, an arbiter (ARB) that forms the core of the ASIC 106, a memory controller that controls the MEM-C 107, a plurality of direct memory access controllers (DMAC) that rotates image data by hardware logic or the like, and a PCI unit that performs data transfer between the scanner unit 131 and the printer unit 132 via the PCI bus 122. The ASIC 106 may be connected by an interface such as a universal serial bus (USB) or Institute of Electrical and Electronics Engineers 1394 (IEEE 1394).

The MEM-C 107 is a local memory used as a copy image buffer and a code buffer. The HD 109 is a storage for accumulating image data, accumulating font data used for printing, accumulating forms, and the like. The HD 109 controls reading or writing of data from/to the HD 109 under the control of the CPU 101.

The AGP bus 121 is a bus interface for a graphics accelerator card, which is proposed to accelerate graphics processing. The AGP bus 121 can speed up a graphics accelerator card by directly accessing the MEM-P 102 with high throughput.

Furthermore, the short-range communication circuit 120 includes a short-range communication antenna 120a. The short-range communication circuit 120 is a communication circuit in compliance with the near field communication (NFC), Bluetooth® and the like.

The engine control unit 130 includes the scanner unit 131 and the printer unit 132. The operation panel 140 includes a panel display 140a such as a touch panel that displays a display screen or selection screen of current setting values and others and accepts an input from an operator, and operation keys 140b that include a numeric keypad accepting setting values of conditions for image formation such as a density setting condition and a start key accepting a copy start instruction.

The controller 110 controls the entire image forming apparatus 10, and controls, for example, drawing, communication, input from the operation panel 140, and others. The scanner unit 131 or the printer unit 132 executes image processing such as error diffusion or gamma conversion.

The network I/F 150 is an interface for performing data communication using the communication network 30. The short-range communication circuit 120 and the network I/F 150 are electrically connected to the ASIC 106 via the PCI bus 122.

Next, functions of the image forming apparatus 10 will be described with reference to the drawings.

FIG. 3 is a diagram illustrating an example of functions of the image forming apparatus.

The image forming apparatus 10 includes a log generation monitoring unit 11, a process stop unit 12, a process restart unit 13, a job execution unit 14, a warning display unit 15, and a storage unit 16.

The log generation monitoring unit 11 generates and monitors log data. Specifically, the log generation monitoring unit 11 generates log data indicating a history of execution of processes by the job execution unit 14. The log generation monitoring unit 11 stores the generated log data in the storage unit 16, and periodically measures the amount of the stored log data. For example, the log generation monitoring unit 11 generates job log data and image log data, and measures the amount of job log data and the amount of image log data.

In addition, the log generation monitoring unit 11 compares the amount of log data with various preset thresholds, and executes a determination process that affects the behavior of each functional unit described later.

The log generation monitoring unit 11 is implemented by the CPU 101 executing a process defined in a program stored in the ROM 102a, the RAM 102b, or the like and controlling the HD 909 or the like.

The process stop unit 12 stops the execution of the process when the process is being executed and the amount of log data in the storage unit 16 is larger than a predetermined threshold (first threshold Ta). In addition, if the log data in the storage unit 16 includes a plurality of types of log data, the process stop unit 12 stops the execution of the process when the process is being executed and the amount of any one of the plurality of types of log data in the storage unit 16 is larger than the first threshold Ta set for the corresponding type.

Specifically, the process stop unit 12 stops the execution of the job when the amount of image log data is larger than the first threshold Ta1 of the image log data or the amount of job log data is larger than a first threshold Ta2 of the job log data.

The stoppage of the process (job) by the process stop unit 12 means that the job execution unit 14 does not newly execute a process (job) until the process restart unit 13 restarts next time. The process stop unit 12 may not stop the process that is already being executed. For example, when the process stop unit 12 stops execution of a job, the job execution unit 14 does not execute a job that has been requested thereafter and a job that is waiting to be started.

The process restart unit 13 restarts the execution of the process when the execution of the process is stopped and the amount of log data in the storage unit 16 is smaller than a second threshold Tb which is smaller than the first threshold Ta. In addition, if the log data in the storage unit 16 includes a plurality of types of log data, the process restart unit 13 restarts the execution of the process when the execution of the process is stopped and the amounts of all the plurality of types of log data in the storage unit 16 are smaller than the second thresholds Tb set for the corresponding types.

Specifically, the process restart unit 13 restarts the execution of the job when the amount of image log data is smaller than the second threshold Tb1 of the image log data and the amount of job log data is smaller than the second threshold Tb2 of the job log data.

The restart of execution of the process (job) by the process restart unit 13 means that the job execution unit 14 returns from a state in which not to execute the process (job) to a state in which to execute the process (job). For example, the job execution unit 14 is defined to, when the process restart unit 13 restarts the execution of the job, execute a job that has been requested thereafter and a job waiting for being started.

The process stop unit 12 and the process restart unit 13 are implemented by the CPU 101 executing a process defined in a program stored in the ROM 102a, the RAM 102b, or the like.

The job execution unit 14 executes a job. Specifically, when the process stop unit 12 stops the execution of a job, the job execution unit 14 does not execute a job until the process restart unit 13 restarts the execution of a job, and executes a job in other cases. In order to sequentially execute requested jobs, the job execution unit 14 may store data indicating the jobs waiting for being processed in a queue. In a state where the execution of a job is stopped, the job execution unit 14 stores all the requested jobs in the queue, and after restarting the execution of a job, the job execution unit 14 sequentially executes the jobs stored in the queue.

The job execution unit 14 is implemented by the CPU 101 executing a process defined in a program stored in the ROM 102a, the RAM 102b, or the like and controlling the engine control unit 130 or the like.

The warning display unit 15 displays a warning when the amount of log data stored in the storage unit 16 is larger than a third threshold Tc. Specifically, the warning display unit 15 displays a warning when the amount of any of the plurality of types of log data is larger than the third threshold Tc set for the corresponding type. For example, the warning display unit 15 displays a warning when the amount of image log data is larger than a third threshold Tc1 of the image log data or the amount of job log data is larger than a third threshold Tc2 of the job log data.

A method of displaying a warning by the warning display unit 15 includes various methods. For example, the warning display unit 15 displays a warning message on the screen of the panel display 140a of the operation panel 140. In addition, the warning display unit 15 may blink in yellow a lamp such as a light emitting diode (LED) provided in the image forming apparatus 10.

When the warning display unit 15 blinks in yellow a lamp such as a light emitting diode (LED), the process stop unit 12 may change the behavior of the lamp such as the LED to blinking in red, and the process restart unit 13 may return the behavior of the lamp such as the LED to blinking in yellow. The process stop unit 12 or the process restart unit 13 may transmit an e-mail to the e-mail address of the administrator, display a banner, or display a pop-up in order to notify the stop or restart of the process.

The warning display unit 15 is implemented by the CPU 101 executing a process defined in a program stored in the ROM 102a, the RAM 102b, or the like and controlling the operation panel 140 or the like.

The storage unit 16 stores various data. Specifically, the storage unit 16 stores log data including the image log data 901 and the job log data 902. The storage unit 16 also stores threshold information 903.

The storage unit 16 is implemented by the CPU 101 executing a process defined in a program stored in the ROM 102a, the RAM 102b, or the like and controlling the HD 909 or the like.

FIG. 4 is a diagram illustrating an example of threshold information.

The threshold information 903 is information indicating a threshold for each type of log data. Each value in the threshold information 903 is set in advance by a user such as an administrator. For example, in the threshold information 903 of FIG. 4, the first threshold Ta1 of the image log is set to 1700, and the first threshold Ta2 of the job log is set to 3200. Each threshold illustrated in FIG. 4 is a value indicating the number of pieces of log data. In this case, the log generation monitoring unit 11 acquires the number of pieces of log data, and determines whether to stop or restart the process based on the number of pieces of log data.

Each threshold may be defined by a data size of log data such as the number of bytes. In this case, the log generation monitoring unit 11 acquires the data size of log data, and determines whether to stop or restart the process based on the data size of log data. For example, if the data size of each log data greatly differs due to the nature of process, it is desirable to perform the process based on the data size.

Next, the operations of the image forming system 1 will be described with reference to the drawings.

Figure 5:
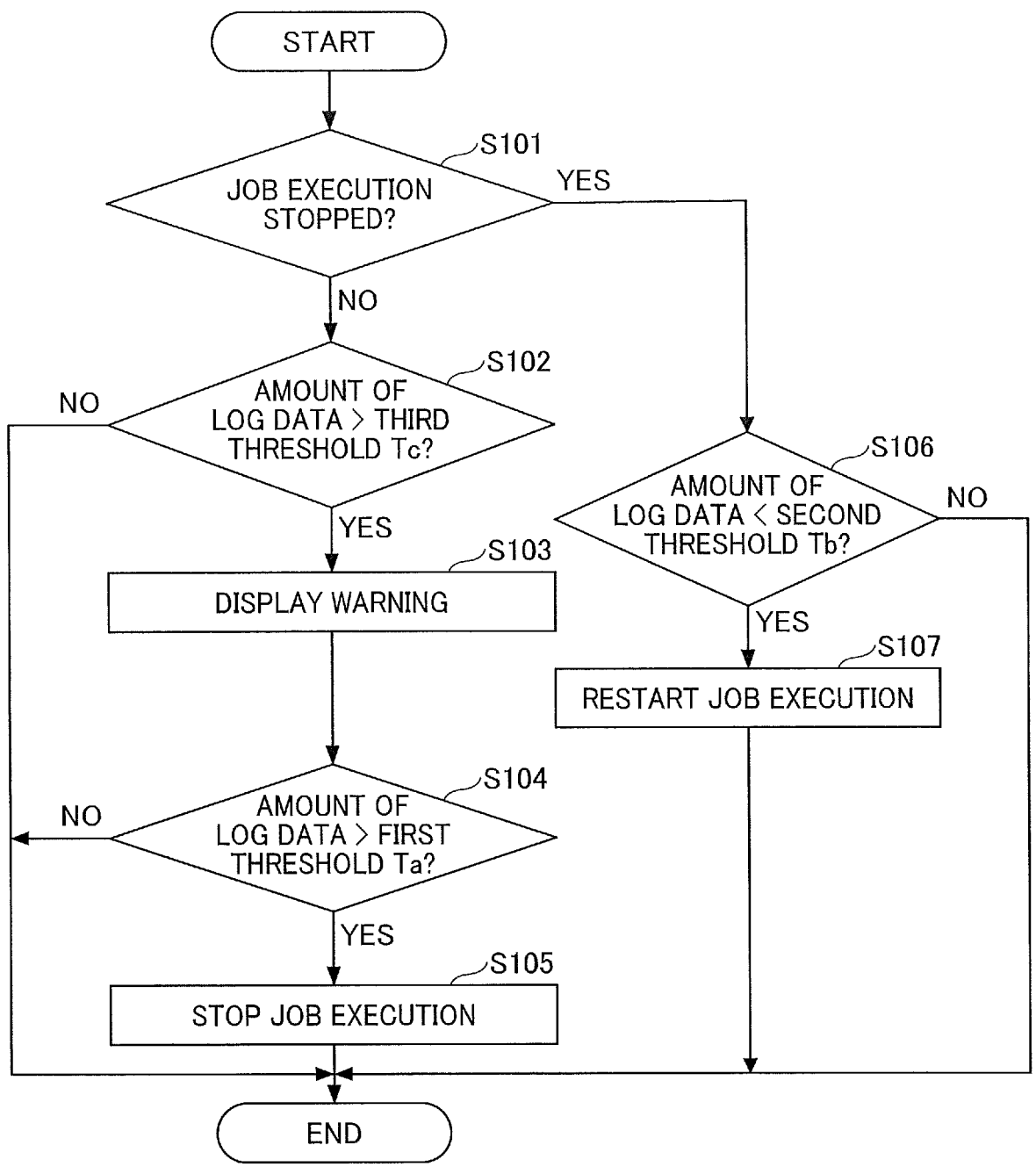
FIG. 5 is a diagram illustrating an example of a flow of a job stop/restart process.

FIG. 5 is a diagram illustrating an example of a flow of a job stop/restart process.

The image forming apparatus 10 periodically performs the job stop/restart process illustrated in FIG. 5, for example, every minute. In addition to the job stop/restart process, the log generation monitoring unit 11 and the job execution unit 14 execute various processes such as generation of a log and execution of a job.

When starting the job stop/restart process, the image forming apparatus 10 determines whether the execution of a job is stopped (step S101). The state in which the execution of the job is stopped is a state in which the job execution unit 14 does not execute a job, and specifically, a state after the process stop unit 12 stops the execution of a job in the process of step S105 to be described later until the process restart unit 13 restarts the execution of a job in the process of step S107 to be described later.

When the image forming apparatus 10 determines that the execution of a job is not stopped (step S101: No), the log generation monitoring unit 11 determines whether the amount of log data is larger than the third threshold Tc (step S102). Specifically, when the amount of image log data is larger than the third threshold Tc1 of the image log data or the amount of job log data is larger than the third threshold Tc2 of the job log data, the log generation monitoring unit 11 determines that the amount of log data is larger than the third threshold Tc.

When determining that the amount of log data is not larger than the third threshold Tc (step S102: No), the log generation monitoring unit 11 ends the job stop/restart process.

When the log generation monitoring unit 11 determines that the amount of log data is larger than the third threshold Tc (step S102: Yes), the warning display unit 15 displays a warning (step S103).

Next, the log generation monitoring unit 11 determines whether the amount of log data is larger than the first threshold Ta (step S104). Specifically, when the amount of image log data is larger than the first threshold Ta1 of the image log data or the amount of job log data is larger than the first threshold Ta2 of the job log data, the log generation monitoring unit 11 determines that the amount of log data is larger than the first threshold Ta.

When determining that the amount of log data is not larger than the first threshold Ta (step S104: No), the log generation monitoring unit 11 ends the job stop/restart process.

When the log generation monitoring unit 11 determines that the amount of log data is larger than the first threshold Ta (step S104: Yes), the process stop unit 12 stops the execution of a job (step S105) and ends the job stop/restart process. As a result, the job execution unit 14 comes into a state of not newly executing a job.

When the image forming apparatus 10 determines that the execution of a job is stopped in step S101 (step S101: Yes), the log generation monitoring unit 11 determines whether the amount of log data is less than the second threshold Tb (step S106). Specifically, when the amount of image log data is smaller than the second threshold Tb1 of the image log data and the amount of job log data is smaller than the second threshold Tb2 of the job log data, the log generation monitoring unit 11 determines that the amount of log data is smaller than the second threshold Tb.

When determining that the amount of log data is not smaller than the second threshold Tb (step S106: No), the log generation monitoring unit 11 ends the job stop/restart process. As a result, the job execution unit 14 is maintained in a state of not executing a job.

When the log generation monitoring unit 11 determines that the amount of log data is smaller than the second threshold Tb (step S106: Yes), the process restart unit 13 restarts the execution of a job (step S107) and ends the job stop/restart process. As a result, the job execution unit 14 returns to the state of executing a job.

Figure 6:
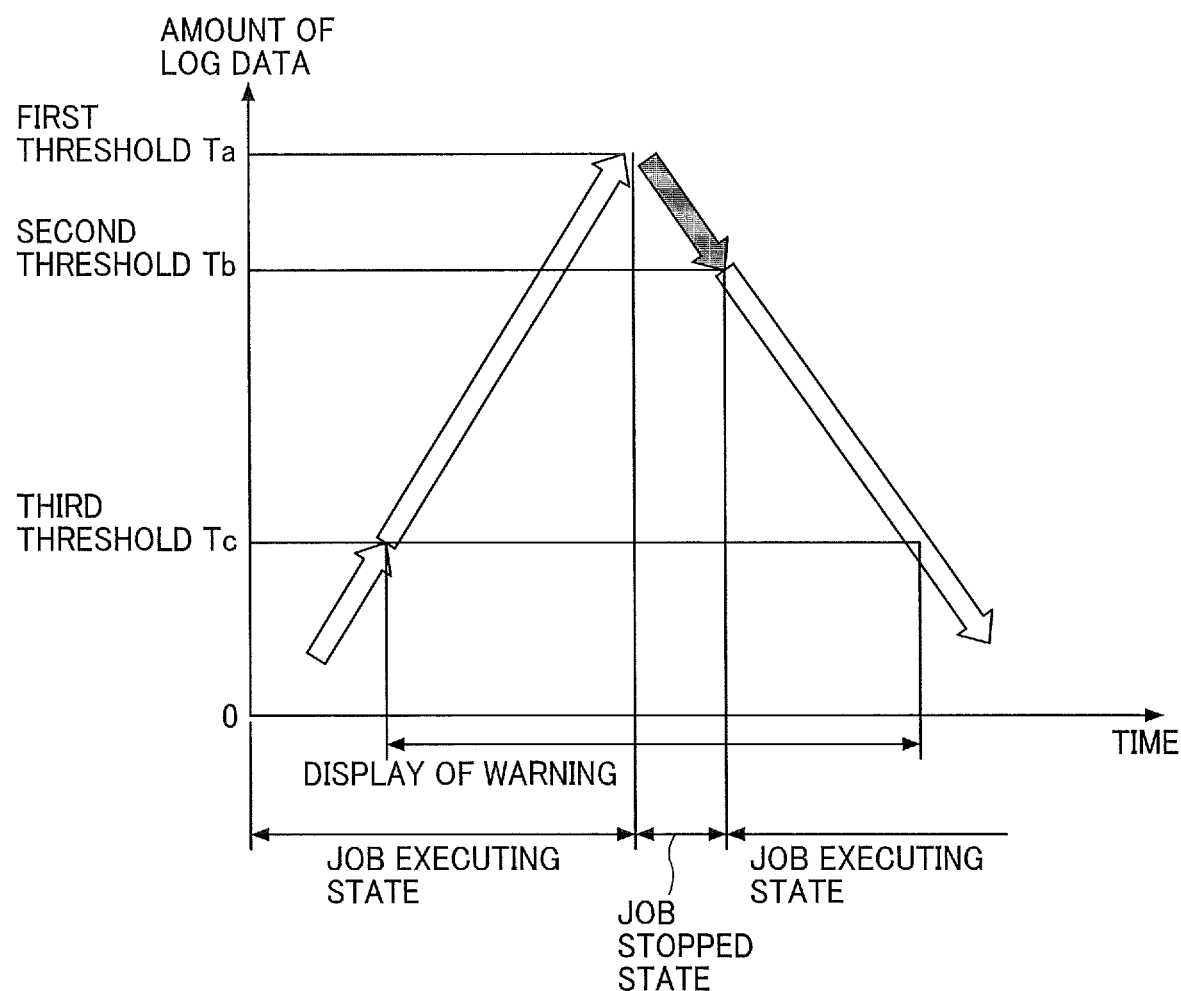
FIG. 6 is a diagram illustrating an execution result of the job stop/restart process.

FIG. 6 is a diagram for describing an execution result of the job stop/restart process.

If no countermeasures are taken when log data stagnates due to a factor such as a failure in transfer of the log data and the stored log data increases unlimitedly, the margin of a storage area in which the log data is stored would be lost and thus the apparatus might not operate normally.

In the present embodiment, for example, log data might accumulate without being deleted due to a cause such as an abnormality in the transfer process to the log management server 20, such as a failure in a communication state of the communication network 30. Hence, when the amount of log data becomes larger than the third threshold Tc, the warning display unit 15 displays a warning in step S103 of the job stop/restart process illustrated in FIG. 5. As a result, if the third threshold Tc is appropriately set, the user such as the administrator can notice the accumulation of the log data at an early stage before the log data tightens the storage area, so that an early response can be made.

Next, when the amount of log data becomes larger than the first threshold Ta, the process stop unit 12 stops the execution of a job in step S105 of the job stop/restart process illustrated in FIG. 5. As a result, the image forming apparatus 10 transitions from the job execution state to the job stop state. If the first threshold Ta is appropriately set, the image forming apparatus 10 enters a state executing no job so that log data is no longer generated. Therefore, it is possible to prevent an increase in the log data before the log data tightens the storage area.

The process stop unit 12 stops the execution of a process when the amount of any of the plurality of types of log data is larger than the first threshold Ta set for the corresponding type. As a result, when the amount of log data of one type among the plurality of types of log data is larger than the first threshold Ta, the execution of the process is stopped, so that an increase in the log data can be more reliably prevented.

Next, when the transfer and deletion of the log data are normalized due to improvement in the communication state of the network or the like, the amount of log data decreases. Then, when the amount of log data becomes smaller than the second threshold Tb, the process restart unit 13 restarts the execution of a job in step S107 of the job stop/restart process illustrated in FIG. 5. As a result, the image forming apparatus 10 transitions again from the job stop state to the job execution state. If the second threshold Tb is appropriately set, the execution of a job can be restarted after the amount of log data decreases to a state in which it is unlikely that the log data increases again and becomes larger than the first threshold Ta. Therefore, stable job execution can be performed.

In addition, the process restart unit 13 restarts the execution of a process in a case where the amounts of the plurality of types of log data are all smaller than the second thresholds Tb set for the corresponding types. As a result, since the execution of a process is restarted only when the amounts of all types of log data among the plurality of types of log data are smaller than the second thresholds Tb, it is possible to more reliably prevent an increase in the log data.

In FIG. 4, the first threshold Ta takes the same value as the total value of the second threshold Tb and the third threshold Tc. As described above, the difference between the first threshold Ta related to the stop of a process (job) and the second threshold Tb related to the restart of a process (job) is desirably substantially the same value as the third threshold Tc related to the display of a warning.

Since the warning display unit 15 is designed to display a warning when the amount of log data becomes larger than the third threshold Tc, the third threshold Tc is set to a value at which various types of log data are considered not to reach the value in a normal operation state. Therefore, by setting the difference between the first threshold Ta and the second threshold Tb to be substantially the same as the third threshold Tc, the second threshold Tb can be set to a value that is considered not to exceed the first threshold Ta again in normal operation even in the determination of whether to restart the execution of a job.

The threshold information 903 illustrated in FIG. 4 may be generated by a learning effect of machine learning. In addition, no correspondence table may be used by predicting the increase rate of the log data by machine learning. Herein, the machine learning refers to a technology for causing a computer to acquire a learning ability like a person, and refers to a technology in which a computer autonomously generates an algorithm necessary for determination such as data identification from learning data taken in advance, and applies the algorithm to new data to perform prediction. A learning method for machine learning may be any one of supervised learning, unsupervised learning, semi-supervised learning, reinforcement learning, and deep learning, and may be a learning method combining these learning methods, and a learning method for machine learning is not limited.

In an embodiment, the image forming apparatus 10 includes a plurality of computing devices, such as a server cluster. The plurality of computing devices is configured to communicate with each other over any type of communication link, including a network, shared memory, or the like, and may perform the processes disclosed herein.

Each function of the embodiments described above can be realized by one or more processing circuits. Here, the "processing circuit or circuitry" in the present specification includes a programmed processor to execute each function by software, such as a processor implemented by an electronic circuit, and devices, such as an application specific integrated circuit (ASIC), a digital signal processor (DSP), a field programmable gate array (FPGA), and conventional circuit components arranged to perform the recited each function.

Furthermore, the image forming apparatus 10 according to the above-described embodiments only needs to have an information processing function, and for example, may include a projector (PJ), an output device such as a digital signage, a remote conference device, a head up display (HUD) device, an industrial machine, a medical device, a network home appliance, an automobile (connected car), a notebook personal computer (PC), a mobile phone, a tablet terminal, a game machine, a personal digital assistant (PDA), a digital camera, an omnidirectional panoramic image capturing device, a wearable PC, a desktop PC, or the like.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. An information processing apparatus comprising:
a memory configured to store log data generated by an execution of a process, the log data in the memory includes a plurality of types of log data; and
processing circuitry configured to:
stop the execution of the process in a state where the process is being executed and when an amount of any one of the plurality of types of log data in the memory is larger than a first threshold set for the any one of the plurality of types of log data; and
restart the execution of the process in a state where the execution of the process is stopped and when the amount of each one of the plurality of types of log data in the memory is smaller than a second threshold set for each one of the plurality of types of log data, the second threshold being smaller than the first threshold.

2. The information processing apparatus according to claim 1,
wherein the processing circuitry is configured to execute a process of forming an image for each job,
wherein the plurality of types of log data includes image log data indicating an image and job log data indicating a job execution history,
wherein the first threshold is different between the image log data and the job log data, and
wherein the second threshold is different between the image log data and the job log data.

3. The information processing apparatus according to claim 1, further comprising a display configured to display a warning when the amount of the log data is larger than a third threshold,
wherein the first threshold is a value substantially equal to a total value of the second threshold and the third threshold.

4. The information processing apparatus according to claim 3,
wherein the log data in the memory includes a plurality of types of log data, and
wherein the display is configured to display a warning when an amount of any one of the plurality of types of log data in the memory is larger than the third threshold set for the any one of the plurality of types of log data.

5. The information processing apparatus according to claim 3, wherein the warning comprises at least one of a warning message and a blinking light emitting diode (LED).

6. An information processing method to be executed by an information processing apparatus configured to store log data generated by an execution of a process, the log data in the memory including a plurality of types of log data, the method comprising:
stopping the execution of the process in a state where the process is being executed and when an amount of any one of the plurality of types of log data stored in the information processing apparatus is larger than a first threshold set for the any one of the plurality of types of log data; and
restarting the execution of the process in a state where the execution of the process is stopped and when the amount of each one of the plurality of types of log data stored in the information processing apparatus is smaller than a second threshold set for each one of the plurality of types of log data, the second threshold being smaller than the first threshold.

7. A non-transitory recording medium storing computer-readable program code that, when executed by a computer, causes the computer storing log data including a plurality of types of log data, the log data generated by an execution of a process to execute:
stopping the execution of the process in a state where the process is being executed and when an amount of any one of the plurality of types of log data stored in the computer is larger than a first threshold set for the any one of the plurality of types of log data; and
restarting the execution of the process in a state where the execution of the process is stopped and when the amount of each one of the plurality of types of log data stored in the computer is smaller than a second threshold set for each one of the plurality of types of log data, the second threshold being smaller than the first threshold.

* * * * *